(12) United States Patent
Goldmann et al.

(10) Patent No.: US 8,056,729 B2
(45) Date of Patent: Nov. 15, 2011

(54) SYSTEM AND METHOD FOR TREATING SHREDDER RESIDUES AND UTILIZING A PRODUCED FIBER FRACTION

(75) Inventors: Daniel Goldmann, Goslar (DE); Bram den Dunnen, Wolfsburg (DE); Michael Knust, Isenbuettel (DE)

(73) Assignee: Volkswagen AG, Wolfsburg (DE)

( * ) Notice: Subject to any disclaimer, the term of this patent is extended or adjusted under 35 U.S.C. 154(b) by 8 days.

(21) Appl. No.: 11/690,088

(22) Filed: Mar. 22, 2007

(65) Prior Publication Data

US 2007/0158242 A1 Jul. 12, 2007

Related U.S. Application Data

(63) Continuation of application No. 10/415,507, filed as application No. PCT/EP01/10458 on Sep. 11, 2001, now abandoned.

(30) Foreign Application Priority Data

Oct. 27, 2000 (DE) .................................. 100 53 491

(51) Int. Cl.
*B03C 1/30* (2006.01)
(52) U.S. Cl. ........................................................ 209/38
(58) Field of Classification Search .................. 209/3, 8, 209/12.1, 38; 241/19, 24.14, 79.1
See application file for complete search history.

(56) References Cited

U.S. PATENT DOCUMENTS

| | | | |
|---|---|---|---|
| 3,848,813 A | 11/1974 | Stanczyk et al. | |
| 3,885,744 A | 5/1975 | Drage | |
| 4,033,458 A | 7/1977 | Chazen et al. | |
| 4,036,441 A * | 7/1977 | Basten et al. | 241/20 |
| 4,299,376 A | 11/1981 | Weiss | |
| 4,341,353 A | 7/1982 | Hamilton et al. | |
| 4,617,112 A | 10/1986 | Stout et al. | |
| 4,815,668 A * | 3/1989 | Frei | 241/23 |
| 5,080,291 A | 1/1992 | Bloom | |

(Continued)

FOREIGN PATENT DOCUMENTS

DE 42 05 309 8/1993

(Continued)

OTHER PUBLICATIONS

Karl-Ulrich Rudolph et al., "Stand der Behandlung und Verwertung von Shredderrueckstaenden aus Altautos," Muell und Abfall, Dec. 1997, pp. 745 to 755 (translated).

(Continued)

*Primary Examiner* — Joseph C Rodriguez
*Assistant Examiner* — Kalyanavenkateshware Kumar
(74) *Attorney, Agent, or Firm* — Kenyon & Kenyon LLP

(57) ABSTRACT

In a method for sorting shredder residues of metal-containing wastes, in particular of vehicle bodies, where the shredder residues are separated into a shredder light fraction and a non-ferromagnetic fraction) and a system for implementing the method, (a) a crude-fiber fraction being generated during the processing of the shredder light fraction and the shredder heavy fraction in preliminary processes and a main process, by extracting at least a ferromagnetic fraction, a fraction containing nonferrous metals, a granulate fraction, and a sand fraction, and (b) the crude-fiber fraction being separated into a metal-containing dust fraction, a fiber fraction depleted in metals, and a metallic fraction in a refining process, using the successive process steps of metal-balling, dust removal, and density separation.

27 Claims, 2 Drawing Sheets

U.S. PATENT DOCUMENTS

| | | | |
|---|---|---|---|
| 5,133,505 A | 7/1992 | Bourcier et al. | |
| 5,443,157 A * | 8/1995 | Baker et al. | 209/12.1 |
| 5,535,891 A * | 7/1996 | Kuniyone et al. | 209/12.1 |
| 6,070,733 A | 6/2000 | Osing | |
| 6,086,000 A * | 7/2000 | Murata | 241/19 |
| 6,203,595 B1 | 3/2001 | Edlinger | |
| 6,422,493 B1 | 7/2002 | Simon et al. | |
| 6,437,353 B1 | 8/2002 | Benner | |
| 6,578,783 B2 * | 6/2003 | Simon et al. | 241/24.14 |
| 6,666,335 B1 | 12/2003 | Bradley et al. | |
| 2004/0251173 A1 | 12/2004 | Goldmann et al. | |
| 2004/0251335 A1 | 12/2004 | Goldmann et al. | |

FOREIGN PATENT DOCUMENTS

| | | |
|---|---|---|
| DE | 44 37 852 | 5/1996 |
| DE | 195 32 505 | 12/1996 |
| DE | 197 03 577 | 6/1998 |
| DE | 197 24 860 | 12/1998 |
| DE | 197 31 874 | 2/1999 |
| DE | 197 42 214 | 4/1999 |
| DE | 197 55 629 | 6/1999 |
| DE | 199 11 010 | 10/2000 |
| EP | 0 863 114 | 9/1998 |
| EP | 0 884 107 | 12/1998 |
| EP | 0 922 749 | 6/1999 |
| EP | 0 979 677 | 2/2000 |
| GB | 1 466 491 | 3/1977 |
| JP | 8-057857 | 3/1996 |
| JP | 9-194863 | 7/1997 |
| JP | 11-244838 | 9/1999 |
| JP | 2000-051830 | 2/2000 |
| JP | 2002-537992 | 11/2002 |
| WO | WO 98/01276 | 1/1998 |
| WO | WO 00/53324 | 9/2000 |

OTHER PUBLICATIONS

Search Report, European Application No. 06 01 7837, dated Mar. 10, 2008. (translated).

International Search Report, International PCT Application No. PCT/EP01/10458, dated Feb. 15, 2002.

Aufbereitungs-Technik, vol. 8, chapter 392, p. 8, 1975.

International Search Report, International Application No. PCT/EP01/10459, dated Jan. 14, 2002 (translated).

Search Report, European Application No. 06 01 7836, dated Mar. 10, 2008 (translated).

International Search Report, International Application No. PCT/EP01/10460, dated Dec. 18, 2001 (translated).

Search Report, European Application No. 100 53 487.2, dated May 31, 2001.

* cited by examiner

SYSTEM AND METHOD FOR TREATING SHREDDER RESIDUES AND UTILIZING A PRODUCED FIBER FRACTION

CROSS-REFERENCE TO RELATED APPLICATIONS

The present application is a continuation of U.S. patent application Ser. No. 10/415,507 filed Nov. 18, 2003, now abandoned, which was the national stage of PCT International Patent Application No. PCT/EP01/10458, having an international filing date of Sep. 11, 2001, and claims priority to Application No. 100 53 491.0, filed in the Federal Republic of Germany on Oct. 20, 2007, each of which is expressly incorporated herein in its entirety by reference thereto.

FIELD OF THE INVENTION

The present invention relates to a method for sorting shredder residues of metal-containing wastes, e.g., of vehicle bodies, as well as a system by which the shredder residues can be sorted. In addition, the present invention relates to a use of a fiber fraction, which is depleted in dust and metals and was separated according to the method of the present invention.

BACKGROUND INFORMATION

The shredding of scrapped vehicles in order to break down material has been known for a long time. In carrying out the shredding method, method controls have been established in which the material mixture produced is divided up into different fractions. Thus, a so-called shredder light fraction (SLF) is initially separated from the material mixture produced, using a suitable suction device. The remaining fraction is subsequently separated into a ferromagnetic fraction (shredder scrap (SS)) and a non-ferromagnetic fraction (shredder heavy fraction (SHF)), using a permanent-magnet separator. The portion of the shredder scrap-metal fraction that is metallurgically fully usable is often approximately 50 to 75 wt. %. Existing designs generally provide for the shredder light fraction being disposed of as waste or burned in waste incinerators. It is characterized by both a large fraction of organics and a large fraction of fine-grained material. The heavy fraction, which is not able to fly and is not ferromagnetic, i.e., the shredder heavy fraction, is distinguished by a large percentage of nonferrous (NF metals). Special sorting systems have been developed for recovering the various NF metals, where, however, the remaining residue of organic and inorganic, non-metallic components is generally disposed of as waste. In the following, shredder residues should be understood as all material streams from the shredding process, which cannot be directly removed at the shredder as products that are metallurgically directly utilizable (shredder scrap).

Described in German Published Patent Application No. 44 37 852 is a method, in which the shredder light fraction is sorted, in particular to remove "unwanted components", especially copper and glass. In this context, the shredder residues are homogenized and mixed in a compulsory mixer with a fine-grained to superfine-grained material containing a magnetizable component, and the resulting mixture is conveyed through a magnetic separator. In this context, it has been shown that the metallic components of the shredder light fraction, which impede metallurgical use, can be separated out in this manner.

European Published Patent Application No. 0 863 114 provides for the production of a permanently plastic, backfilling material for mines, by adding an adhesive component, a filler, and a salt solution to the shredder light fraction. This is intended to provide a pressure-resistant, permanently plastic body.

It is described in German Published Patent Application No. 197 42 214 that the shredder light fraction can be ground further and subjected to a thermal treatment. In this context, metallic components should be sorted out during or after shredding, and the remaining mixture of materials should be melted in a smelting reactor and converted to a "harmless" solid by cooling it.

In addition, European Published Patent Application No. 0 922 749 describes a method for processing the shredder light fraction, where the shredder light fraction is calcined in a fluidized-bed gasifier amid the introduction of or in the presence of calcium carbonate.

In a further, thermal process, German Published Patent Application No. 197 31 874 provides for the shredder light fraction being compressed again in a further step, and then shredded, homogenized, and reduced in water content, in order to be thermally utilized in a subsequent step.

European Published Patent Application No. 0 884 107 provides for the shredder light fraction being converted into a metal-free fraction having a shredding size of <20 mm, by shredding, classifying, and sorting it. The sorting of the shredder light fraction should result in a thermally utilizable fraction.

In addition to the utilization methods shown, it is conventional that the shredder light fraction can be subjected to a pretreatment, in which residual ferromagnetic fractions of iron, stainless steel, and aluminum are separated. Similar methods have also been used for sorting the shredder heavy fraction. Furthermore, it is conventional that polyolefins can be separated from this fraction.

What the shown methods have in common is, that they are each only designed for processing the shredder light fraction or the shredder heavy fraction. What is not provided is common processing with the objective of separating the shredder residues as much as possible into at least partially utilizable fractions, in particular a fiber fraction utilizable as raw materials or energy, according to current, legal boundary conditions. Against the background of increasing legal requirements (EU End of Life Vehicles Directive, EU Directive on Incineration of Waste, and others), as well as increasing landfill costs and requirements for the material to be landfilled, a higher utilization rate may be, however, desirable. Thus, the German regulation on end of life vehicles of Apr. 1, 1998 provides for over 95 wt. % of a scrapped car having to be utilized as of the year 2015. In addition, increased requirements from the EU Scrapped Car Guideline passed in September, 2000 specify that the fraction of material streams utilizable as materials and raw materials for mechanical and feedstock recycling should be increased to at least 85 wt. %. Thus, utilization excludes the use as energy only, e.g., in waste incinerators. In order to have the possibility of using the produced fiber fraction as a raw material or for energy in blast furnaces, cement factories, or clarifier-sludge incineration plants, it may especially be ensured that disruptive heavy metals occurring in adherent dusts and interlocking wires and strands are removed to the greatest extent possible.

Therefore, an object of the present invention is to provide a method and the system necessary for it, by which shredder residues may be processed, and by which, in particular, at least one high-quality fiber fraction usable as a raw material or for energy may be produced in a mechanical sorting or treatment process.

SUMMARY

According to an example embodiment of the present invention, this object may be achieved by providing a method for sorting shredder residues of metal-containing wastes, e.g., of vehicle bodies, having the features descried herein, by providing a system for sorting shredder residues having the features described herein and by the use of a fiber fraction, which is produced according to an example embodiment of the method of the present invention and has the features described herein. The method may provide that:

(a) during the sorting of the shredder light fraction and the shredder heavy fraction in preliminary processes and a main process, a crude fiber fraction is produced by separating out at least a ferromagnetic fraction, a fraction containing nonferrous metals, a granulate fraction, and a sand fraction; and (b) in a refining process, the crude-fiber fraction is separated into a metal-containing dust fraction, a fiber fraction depleted in dust and metals, and a metallic fraction, using the successive process steps of metal balling, dust removal, and density separation.

The prepared end products may either be utilized directly or, if desired, subsequently processed in further refining steps to form utilizable products of higher quality. The fiber fraction may then be used in blast furnaces, cement factories or clarifier-sludge incineration plants. The fiber fraction to be provided for such an application may have at least the following additional characteristic properties:

a fuel value of >20 MJ/kg
a Cl content of <3.0 wt. %
a Zn content of <1.0 wt. %
a Cu content of <0.2 wt. %
a Pb content of <0.1 wt. %

It may only be possible to render fiber fractions from shredder residues available for utilization as a raw material or for energy in an economically practical manner, and on a large scale, by removing disruptive metal particles and adherent dusts to the greatest extent possible. Depletion in chlorine or depletion in metals means that either the upper limits are complied with and/or the amount of chlorine and/or metal in this granulate is at least 50 wt. %, e.g., 70 wt. % less than the raw granulate.

Consequently, at least one high-quality fiber fraction, a ferromagnetic fraction, a fraction containing nonferrous metals, a granulate fraction, and a sand fraction are produced as end products.

Fe, stainless steel, and Al portions broken down in a preliminary treatment may be separated from the shredder light fraction. This shredder light fraction may be:

broken down in a first shredding unit, and
subsequently separated into at least a ferromagnetic fraction and a non-ferromagnetic fraction, using at least one magnetic separator;
the non-ferromagnetic fraction is broken down in a second shredding unit,
a fine-grained sand fraction is separated from this fraction, using at least one classifier, and
the remaining fraction is separated into a crude-fiber fraction and a course-grained, heavy-material fraction in at least one density-separation device.

The procedure shown, which includes the step-by-step breakdown of the shredder light fraction and the interposed method steps for separating out the particularly abrasive ferromagnetic components, may allow the operating costs to be kept low, e.g., in the case of the second shredding unit. A further, example embodiment provides for a cellular-plastic fraction essentially made up of polyurethane being additionally separated out in the preliminary process, using a suction device.

In the preliminary process, the shredder heavy fraction is also separated into at least an enriched fraction containing nonferrous metals, a heavy-material fraction, and a fine-grained sand fraction depleted in metals, e.g., using at least one metal separator and at least one classifier. In addition, it is possible for a high-density, residual fraction to be separated from the heavy-material fraction in at least one density-separation device. The shredder heavy fraction is separated into different material streams from the standpoint of possible, joint processing with the material streams previously produced in the preliminary process for processing the shredder light fraction.

In the main process, the material streams from the preliminary processes may be brought together in such a manner, that:

the sand fractions are combined into a common sand fraction, and
the heavy-material fractions are combined into a common heavy-material fraction, broken down by a shredding unit, and separated by a density-separation device into the granulate fraction and an enriched fraction containing nonferrous metals.

Therefore, the desired end products of sand, granulate, and the fraction containing nonferrous metals are produced in this partial process step. The fractions containing nonferrous metals may then be subjected to a treatment for separating out light-metal fractions, heavier nonferrous-metal fractions, and other metal fractions, e.g., in a common sorting step, using suitable process steps such as sand flotation and optical sorting. The nonmetallic, residual fractions produced during the separation may be resupplied to the main process and/or the preliminary processes at suitable points, as a function of amount and composition.

Among other things, the crude-fiber fraction supplied by the above-mentioned sorting processes is already a homogeneous product, i.e., certain components able to fly (PU), metals, granulate, and sand have already been separated out. However, the crude-fiber fraction may only be freed of metal particles and adherent metallic dusts still present by refining it. In this context, the metal wires and strands may be balled up. Dust removal occurs after the metals are balled up. The balled metals are separated from the de-dusted fiber fraction in a density-separation device.

Further, aspects and example embodiments of the method are described below.

Example embodiments of the system according to the present invention are described below. Regarding the aspects of the system according to the present invention, reference is made, e.g., to the above-mentioned explanations relating to the method of the present invention.

The present invention is explained below in detail with reference to an exemplary embodiment, using the corresponding drawings.

DETAILED DESCRIPTION

Figure 1:
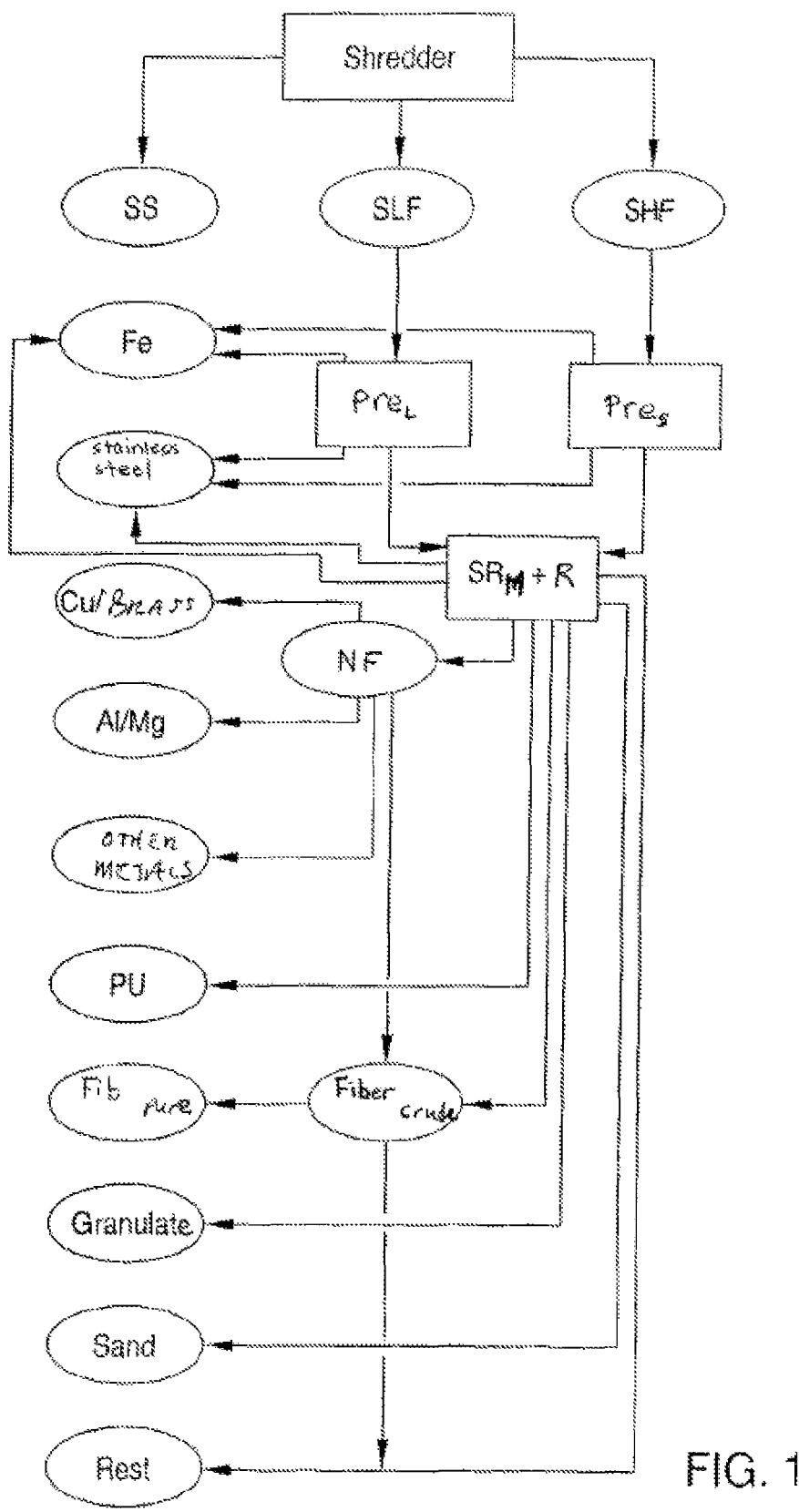
FIG. 1 is a schematic flow diagram giving an overall view of the end products formed at specific times in the process of sorting the shredder residues.

FIG. 1 shows a schematic flow chart of the times at which end products are produced according to an example embodiment of the method of the present invention, during the sorting of the shredder residues. In an upstream shredding process, metal-containing wastes, in particular those of vehicle bodies, are initially broken down by a shredder in a shredding process. A light fraction capable of flying is subsequently separated off by a suction device (shredder light fraction SLF). The heavy material stream, which remains after the suction and is not capable of flying, is separated on a permanent-magnet separator, into a ferromagnetic and a non-ferromagnetic fraction. The ferromagnetic fraction is designated as shredder scrap SS and represents the primary shredder product, which may be used directly in metallurgy. The heavy, non-ferromagnetic fraction not capable of flying is referred to as shredder heavy fraction SHF. In a further pretreatment step, ferromagnetic components still present may be separated from shredder light fraction SLF by a magnetic separator. The remaining material stream of shredder light fraction SLF and shredder heavy fraction SHF are now jointly separated as shredder residues into the desired end products.

To this end, the process control provides a preliminary process $Pre_L$ for shredder light fraction SLF, a preliminary process $Pre_s$ for shredder heavy fraction SHF, a joint, main process $SR_M$, and a refining process R for final processing of at least a part of the primary material streams produced in preliminary processes $Pre_L$, $Pre_s$. According to the exemplary embodiment, fractions, which are predominantly made up of highly pure iron Fe, stainless steel, sand, granulate, fiber depleted in dust and metals $Fiber_{pure}$, cellular plastic PU, and a residue to remove, are formed as end products. In addition, a nonferrous-metal fraction NF may be separated out, which, in turn, appropriate process control allows to be divided up into fractions having heavier nonferrous metals Cu/brass, light metals Al/Mg, and other metals. Except for the residual fraction, the end products formed may be used metallurgically, as materials, as raw materials, and for energy. In particular, refining process R may be designed under the aspect of providing a fiber fraction $Fiber_{pure}$ depleted in dust and metals, which may be utilized as a raw material, or for energy in blast furnaces, cement factories, or installations, etc. To this end, fiber fraction $Fiber_{pure}$ may have at least the following characteristics:

a fuel value of >20 MJ/kg
a Cl content of <3.0 wt. %
a Zn content of <1.0 wt. %
a Cu content of <0.2 wt. %
a Pb content of <0.1 wt. %

The process steps described below allow, in particular, the separation of a fiber fraction $Fiber_{pure}$ from the heterogeneous shredder residues, which meets the above-mentioned specification.

Figure 2:
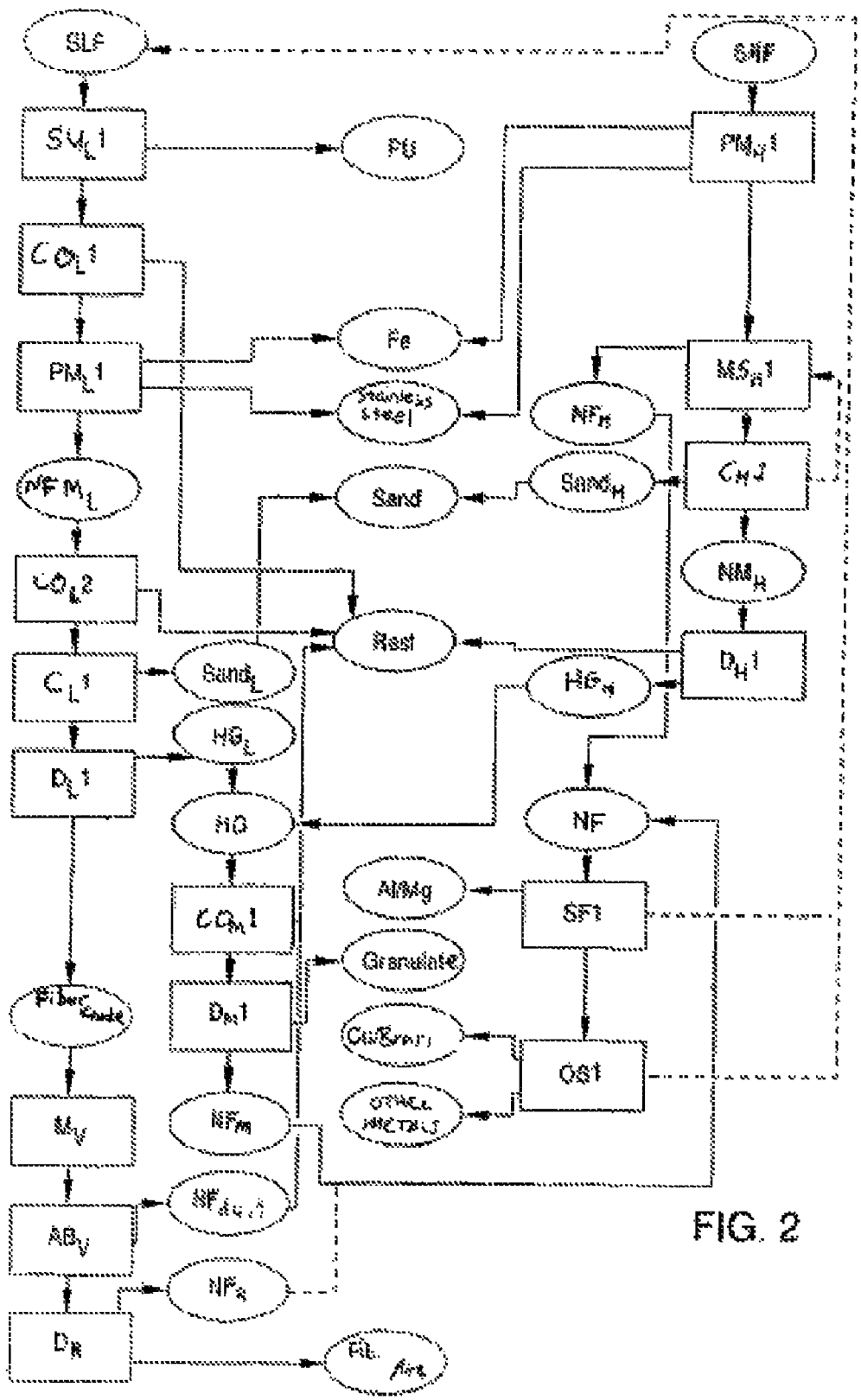
FIG. 2 is a schematic flow diagram for the process control in the preliminary sorting processes and the main sorting process.

FIG. 2 represents a schematic flow diagram of components of the system for sorting the shredder residues, as well as the respective intermediate or end products produced at these components during the process control. In order to retain an overall view, the end products produced during the process are arranged in the center. Preliminary process $Pre_L$ for sorting shredder light fraction SLF is schematically represented in the upper left portion, preliminary process $Pre_s$ for sorting shredder heavy fraction SHF is represented in the upper right portion, main process $SR_M$ is displayed in the center of the lower portion, and refining process R is represented in the lower left portion of the drawing.

Shredder heavy fraction SHF is initially subjected to two-stage Fe and stainless steel separation by permanent-magnet separator $PM_H 1$. After Fe and stainless steel separation, the residual stream is classified, and fractions $NF_H$ containing heavier nonferrous metals are separated out. This may be accomplished, for example, by initial classification into different fractions, e.g., greater than and less than 20 mm, and by separate feeding of each fraction to metal separator $MS_H 1$. It is possible to have additional classification steps. In this context, it may be provided to achieve as clean a material separation as possible into fractions $NF_H$ containing nonferrous metals, and remaining fractions $NM_H$ depleted in metals. Classifier $C_H 1$ also provides for fractions $NM_H$, which are depleted in metals and have a particle diameter, e.g., <6 mm, being separated out as a sand fraction $Sand_H$.

Remaining coarse-grained fraction $NM_H$ depleted in metals is subsequently separated by a density-separation device $D_H 1$ into a heavy-material fraction $HG_H$ and a high-density residual fraction Residue. This may prevent materials, which are still highly abrasive and have sharp edges, such as balls of high-grade steel, from being present in the shredding chamber during the further treatment of heavy-material fraction $HG_H$ in downstream shredding units. In addition, a metal separator may be installed again at this position, in order to separate out the last solid, wear-promoting, metal contaminants. In summary, preliminary process $Pre_s$ accordingly may yield an iron fraction Fe, a stainless steel fraction, a fraction $NF_H$ containing nonferrous metals, a sand fraction $Sand_H$, and a heavy-material fraction $HG_H$.

In preliminary process $Pre_L$, a cellular-plastic fraction PU, which is predominantly made up of the polyurethane that is highly capable of flying, is initially separated from shredder light fraction SLF in suction device $SU_L 1$. The separated pieces of cellular plastic are pneumatically transported into a press container, where they are automatically compressed. This fraction may be directly utilized or optionally undergo a further refining step.

The remaining fraction is broken down in a first shredding unit $Co_L 1$, and indeed in such a manner, that a discharge of unit $Co_L 1$ contains particles having a diameter, e.g., <50 mm. In order to keep the load on shredding unit $Co_L 1$ as small as possible, a classifier may be positioned upstream from it, in order to separate out and supply a fraction having a diameter, e.g., >50 mm. An iron fraction Fe and a stainless steel fraction are separated from the shredded fraction by a permanent-magnet separator $PM_L 1$. Remaining non-ferromagnetic fraction $NFM_L$ is supplied to a second shredding unit $Co_L 2$, in which the material is broken down further. In this context, a discharge of shredding unit $Co_L 2$ is designed to be, e.g., <10 mm. In this case, the infeed of shredding unit $Co_L 2$ may also be limited to a fraction having a diameter, e.g., >10 mm, using a classifier.

In an additional classifier $C_L 1$, a fine-grained sand fraction $Sand_L$ is separated from the now effectively broken-down, non-ferromagnetic fraction $NFM_L$. The particle size of sand fraction $Sand_L$ may be set to <4 mm. The remaining fraction is subjected to air sifting and density separation in a suitable device $D_L 1$. In device $D_L 1$, a light fraction made up of fiber (crude-fiber fraction $Fiber_{crude}$) is blown over a heavy-material trap by a cross-current sifter. Due to being previously transported on a vibrating conveyor, the heavier material has already settled to the bottom, so that the underlying heavy fraction automatically falls down into a heavy-material discharge (heavy-material fraction $HG_L$). In summary, the end products and intermediate products of cellular-plastic pieces PU, iron Fe, stainless steel, $Sand_L$, fiber $Fiber_{crude}$, and heavy material $HG_L$ may be provided in preliminary process $Pre_L$. The dust and sludges, which contain heavy metals and organic substances and are produced during the processing in shredding units $Co_L 1$ and $Co_L 2$, are fed to residual fraction Residue.

In refining process R, crude-fiber fraction Fiber$_{crude}$ is cleaned to the extent that it is available for utilization as a raw material or energy. The requirement forming the basis of present refining process R is to produce a material depleted of heavy metals for use in clarifier-sludge incineration plants, cement factories, or in blast furnaces, etc. Processing is done with regard to the established requirements for such processes, such as capability of being conveyed and blown in, as well as halogen content. However, the level of copper, zinc, and lead may be lowered.

To this end, crude-fiber fraction Fiber$_{crude}$ is mechanically transported by a conveyor belt, directly from the cross-current sifter of main process SR$_M$, into an impact-disk mill M$_V$. In the mill, the copper strands that are stripped away from cable sheathings but are interlocked, as well as other metal wires, are balled up, and the dust that has settled in the fiber braiding is rubbed off. The organic-fiber fraction is not shredded here. The material treated in this manner is subsequently removed by a suction device AB$_V$. A dust separator is integrated into suction device AB$_V$, so that the rubbed-off dust fraction enriched with heavy metals may be separated from the rest of the material stream and concentrated by filtering equipment into a dust fraction NF$_{dust}$.

The de-dusted material is transported onto air-settling tables (density-separation device D$_R$) The balled-up copper strands and other metal wires are separated out here. Copper-rich, nonferrous-metal fraction NF$_R$ of this refining step may be united with copper-rich fractions from main process SR$_M$ or alternatively passed over into the nonferrous-metal sorting process. The remaining light fraction forms fiber fraction Fiber$_{pure}$, which is pneumatically sucked into a press container. Downstream briquetting or pelletizing is possible for use in a blast furnace.

In main process SR$_M$, sand fractions Sand$_L$, Sand$_H$ are initially combined into a common sand fraction Sand. This fraction may optionally undergo a further refining step.

Heavy-material fractions HG$_L$ and HG$_H$ are also combined into a common heavy-material fraction HG. They are subsequently broken down again in a further shredding unit Co$_M$1. A discharge of shredding unit Co$_M$1 is designed to be, e.g., <8 mm. Shredding unit Co$_M$1 usually takes the form of an impeller breaker, in order that the material is optimally broken down at this position. After the shredding, density separation takes place on air-settling tables (density-separation device D$_M$1). The light fraction separated off is predominantly made up of plastic in granular form. If desired, the granulate may be processed further in an independent refining process. Remaining, heavy fraction NF$_M$ is mostly made up of heavier nonferrous metals, mainly copper strands. Therefore, fraction NF$_M$ may already be removed from the process at this point, or it may also be combined with heavier nonferrous-metal fraction NF$_H$ into a common fraction NF, and be jointly sorted.

Fraction NF containing nonferrous metals may be sorted by a sand flotation system SF1 and an optical sorter OS1. Sand flotation may allow a light-metal fraction predominantly made up of aluminum and magnesium to be separated from a heavy-metal fraction in a dry mechanical manner. It should be noted that the sand used here as a separation medium has nothing to do with fraction Sand separated from the shredder residues. The heavy metals sink into the sand bed, while the light metals float on the sand bed. An upper stream containing light metals and the lower screen enriched with the heavy metals are separated by a separating partition. The metal concentrates are separated again from separating medium Sand in a process step belonging to sand flotation. Separated aluminum and magnesium fraction Al/Mg may optionally be separated to a further extent.

The separated heavy fraction (e.g., zinc Zn, copper Cu, brass, lead Pb, and possibly V4A steel) is separated into the nonferrous metals copper/brass and other metals, using optical sorter OS1. Depending on the amount and composition, any nonmetallic residues produced here may be fed in at a suitable position, such as, in this case, into preliminary process Pre$_L$. In summary, an Al/Mg fraction, a Cu/brass fraction, a fraction having other metals, a sand friction Sand, and a granulate fraction Granulate are provided in main process SRm having subsequent nonferrous-metal separation.

LIST OF REFERENCE SYMBOLS

SU$_L$1, AB$_V$ suction devices
Al/Mg light-metal fraction
Cu/brass heavier nonferrous metal fraction
D$_M$1, D$_L$1, D$_H$1, D$_R$ density-separation devices
Fe iron fraction
Fiber$_{pure}$ granulate fraction depleted in chlorine and metals
Fiber$_{crude}$ fiber fraction
Granulate granulate fraction
C$_L$1, C$_H$1 classifiers
MS$_H$1 metal separator/all-metal separator
M$_V$ impact-disk mill
NF, NF$_M$, NF$_L$, NF$_H$, Nf$_{dust}$, NF$_R$ fractions containing nonferrous metals
NFM$_L$ non-ferromagnetic fraction
NM$_H$ fraction depleted in metals
OS1 optical sorter
PM$_L$1, PM$_H$1 permanent-magnet separator
PU cellular-plastic fraction
Residue residual fraction
Sand, Sand$_L$, Sand$_H$ sand fractions
SF1 sand flotation system
HG, HG$_L$, HG$_H$ heavy-material fractions
SLF shredder light fraction
other metals fraction having other metals
SR$_M$ main process
SS shredder scrap
SHF shredder heavy fraction
R refining process for the crude-fiber fraction
Pre$_L$ preliminary process for the shredder light fraction
Pre$_s$ preliminary process for the shredder heavy fraction
Co$_L$1, Co$_L$2, Co$_M$1 shredding units

What is claimed is:

1. A method for sorting shredder residue of metal-containing waste, comprising:
   separating the shredder residue into a shredder light fraction and a shredder heavy fraction;
   sorting the shredder light fraction in a preliminary process;
   supplying a material stream, obtained from the separating and the sorting, to a main process;
   generating a crude-fiber fraction in the main process; and
   separating, from the crude-fiber fraction, in a refining process, a fiber fraction lacking in metal;
   wherein at least one of the main process and the preliminary process includes extracting at least one of a ferromagnetic fraction, a fraction containing nonferrous metals, a granulate fraction and a sand fraction.

2. The method according to claim 1, wherein the metal-containing waste includes waste of a vehicle body.

3. The method according to claim 1, further comprising supplying an additional material stream to the main process obtained by breaking down the shredder residue into the shredder light fraction and the shredder heavy fraction and by sorting the shredder heavy fraction in a preliminary process.

4. The method according to claim 1, wherein the crude fiber fraction is separated into at least one of a metal-containing dust fraction, the fiber fraction lacking in metal and a metal fraction.

5. The method according to claim 1, wherein the crude fiber fraction is separated in one of (a) at least one of metal balling, dust removal and density separation and (b) at least two of metal balling, dust removal and density separation.

6. The method according to claim 1, further comprising separating the crude fiber fraction from at least the shredder light fraction.

7. The method according to claim 1, further comprising pretreating the shredder light fraction by a magnetic separator to separate out residual, ferromagnetic fractions.

8. The method according to claim 1, wherein the preliminary process includes separating from the shredder light fraction at least one of the ferromagnetic fraction, a fine-grained sand fraction, the crude-fiber fraction and a granular grained, heavy material fraction using at least one of shredding, metal separation, classification and density separation.

9. The method according to claim 1, wherein the preliminary process includes separating a cellular-plastic fraction from the shredder light fraction with a suction device.

10. The method according to claim 8, wherein one of (a) at least 60 wt. % and (b) at least 80 wt. % of the heavy material fraction has a diameter of 4 to 10 mm obtained by at least one of shredding and classification.

11. The method according to claim 3, wherein the preliminary process includes separating from the shredder heavy fraction at least one of a fraction containing nonferrous metals, a fine-grained sand fraction lacking in metals, a high-density residual fraction and a heavy-material fraction by at least one of metal separation, classification and density separation.

12. The method according to claim 11, wherein one of (a) at least 60 wt. % and (b) at least 80 wt. % of the heavy-material fraction is obtained at a diameter of >6 mm by classification.

13. The method according to claim 8, wherein the main process includes breaking down the heavy-material fraction by a shredding unit and separating, by a density-separation device, the heavy-material fraction into at least one of a granulate fraction and an enriched faction containing nonferrous metal.

14. The method according to claim 13, wherein a discharge of the shredding unit is <8 mm.

15. The method according to claim 3, wherein a heavy nonferrous metal fraction and a heavy fraction including mostly nonferrous metals are combined to form the metal fraction.

16. The method according to claim 1, wherein the crude fiber fraction includes balled-up metal wires and strands.

17. The method according to claim 1, further comprising separating out dusts containing heavy metals.

18. The method according to claim 1, further comprising separating out balled-up metal wires and strands.

19. The method according to claim 1, further comprising integrating the fraction containing nonferrous metal produced during the separation in the refining process into a sorting process of the fraction containing non-ferrous metal as a function of amount and composition.

20. The method according to claim 1, further comprising at least one of (a) pelletizing and (b) forming into briquettes the fiber fraction.

21. The method according to claim 1, wherein the fiber fraction includes at least a first two of (a) a fuel value of >20 MJ/kg, (b) a Cl content of <3.0 wt. %, (c) a Zn content of <1.0 wt. %, (d) a Cu content of <0.2 wt. % and (e) a Pb content of <0.1 wt. %.

22. The method according to claim 1, wherein the crude fiber fraction is separated into at least two of a metal-containing dust fraction, a fiber fraction lacking in metal and a metal fraction.

23. The method according to claim 1, further comprising separating the crude fiber fraction from only the shredder light fraction.

24. The method according to claim 1, wherein the preliminary process includes separating from the shredder light fraction at least two of the ferromagnetic fraction, a fine-grained sand fraction, the crude-fiber fraction and a granular grained, heavy material fraction, using at least one of shredding, metal separation, classification and density separation.

25. The method according to claim 1, wherein the preliminary process includes separating from the shredder light fraction at least three of the ferromagnetic fraction, a fine-grained sand fraction, the crude-fiber fraction and a granular grained, heavy material fraction, using at least one of shredding, metal separation, classification and density separation.

26. The method according to claim 3, wherein the preliminary process includes separating from the shredder heavy fraction at least two of a fraction containing nonferrous metals, a fine-grained sand fraction lacking in metals, a high-density residual fraction and a heavy-material fraction by at least one of metal separation, classification and density separation.

27. The method according to claim 3, wherein the preliminary process includes separating from the shredder heavy fraction at least three of a fraction containing nonferrous metals, a fine-grained sand fraction lacking in metals, a high-density residual fraction and a heavy-material fraction by at least one of metal separation, classification and density separation.

* * * * *